United States Patent [19]

Spencer

[11] Patent Number: 4,569,577
[45] Date of Patent: Feb. 11, 1986

[54] PHOTOGRAPHIC ANIMATION TRANSFER PROCESS

[75] Inventor: David W. Spencer, North Hollywood, Calif.

[73] Assignee: Walt Disney Productions, Burbank, Calif.

[21] Appl. No.: 611,422

[22] Filed: May 17, 1984

[51] Int. Cl.[4] ............................................. G03B 21/32
[52] U.S. Cl. ....................................... 352/87; 352/51; 355/77
[58] Field of Search ....................... 352/87, 50, 51, 52; 355/122, 123, 77

[56] References Cited

U.S. PATENT DOCUMENTS 1,143,542  6/1915  Hurd .
2,091,144  8/1937  Freil ..................................... 352/52
2,246,561  6/1941  Wheelan et al. ....................... 355/77
2,362,980  11/1944  Ball .
2,998,313  8/1961  Maurer ................................... 352/87

Primary Examiner—Monroe H. Hayes
Attorney, Agent, or Firm—Fulwider, Patton, Rieber, Lee & Utecht

[57] ABSTRACT

A photographic process is provided for transferring an animation sketch or the like from paper onto a transparent cell for use in making animated motion pictures and the like. The animation sketch on paper is photographed to produce a negative of the sketch which is then used as a mask during exposure of a transparent cell bearing a light-sensitive dye film of selected color. Masked portions of the dye film are removed from the cell leaving the exposed cured portions defining a replica of the animation sketch to form a so-called cartoon cell. The thus-formed cartoon cell is backed-up with color as required and composited with other cells having other sketches transferred thereto to form an animation scene.

24 Claims, 6 Drawing Figures

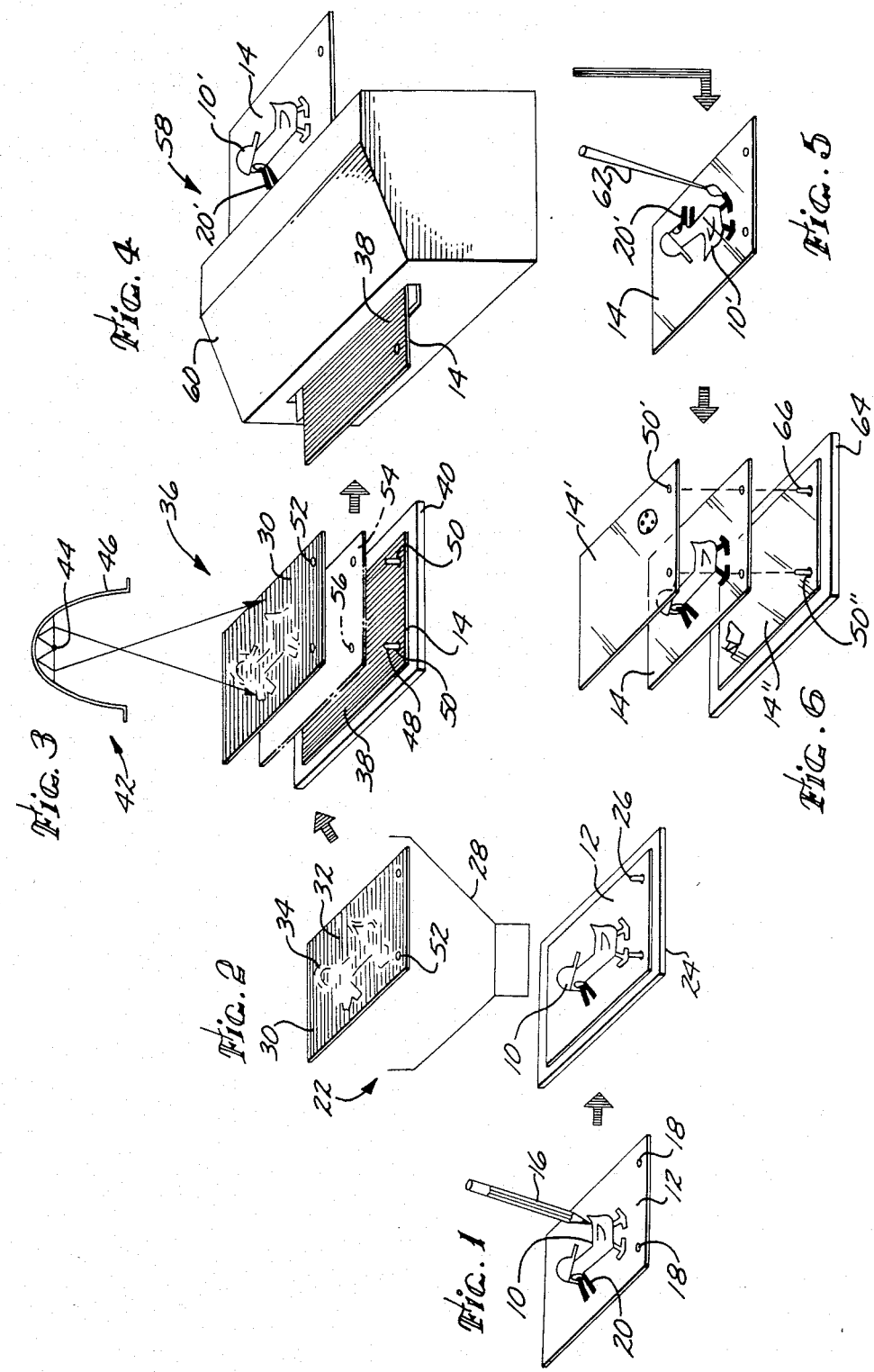

PHOTOGRAPHIC ANIMATION TRANSFER PROCESS

BACKGROUND OF THE INVENTION

This invention relates generally to an improved process for making animated motion pictures and the like. More particularly, this invention relates to an improved process for rapidly and economically producing individual animation or cartoon cells of improved quality which may be assembled to form an animation scene.

Early animated motion pictures, referred to commonly as cartoons, originated from a succession of outline sketches of animated characters drawn on paper to depict sequences of character movement. Each outline sketch was traced using ink or pencil onto a transparent sheet of celluloid acetate, commonly referred to as a "cell" to produce a so-called cartoon cell which was then back-up on the reverse side with selected paint, shading, highlighting, and the like to complete the animated character or characters in a single position of movement. Several of these cells were then assembled in stacked registration to produce a composited animation scene which was photographed to provide, for example, a single frame of an animated motion picture. This process, however, undesirably required many hours of skilled hand labor particularly with respect to the step of tracing an artist's paper sketches onto the individual transparent cells, thereby making production of animated motion pictures relatively costly. Moreover, the completed animation or cartoon cells were relatively fragile and damaged easily during handling, for example, by peeling or chipping of paint or by sharp bending of the transparent acetate sheet. Replacements for damaged cells could be obtained only by costly retracing of the original paper sketch onto a fresh transparent acetate sheet.

In more recent years, hand tracing of original paper sketches onto transparent cells has been largely superseded by a so-called photocopy process. In the photocopy process, an original outline character sketch on paper is individually photocopied directly onto a transparent cell of celluoid acetate or the like, after which the cell is backed-up with paint and composited with other similarly produced cells to form an animation scene. This photocopy process constituted a major advance in the animation industry by eliminating hand tracing and furthermore by producing a truer replica of the artist's original sketch directly onto the transparent cell. However, the character image formed on the transparent cell is defined by tiny ridges of electromagnetically deposited carbon powder which has been found to chip relatively easily from the cell surface resulting in smudging which appears in the animation scene as unwanted dark spots or regions. Moreover, the photocopy process inherently deposits onto the cell a significant amount of background clutter consisting of random spots and occasional faint lines which must be removed by manual erasure to avoid dark spots in the animation scene. Still further, when the photocopy process is used, the original paper sketch is limited to an outline depiction and cannot include extensive dark or shaded regions which generally cannot be photocopied without undesirable variation in density.

There exists, therefore, a significant need for an improved process for transferring an animation sketch onto a transparent cell without requiring deposition of line-forming material onto the cell and further without requiring manual erasure of significant background clutter. The present invention fulfills these needs and provides further related advantages.

SUMMARY OF THE INVENTION

In accordance with the invention, an improved animation transfer process is provided for transferring an original outline sketch or the like on paper of an animated character or characters to a transparent cell for use in making an animation scene. The paper sketch is photographed to produce a photographic negative which is then placed as a mask over a transparent cell bearing a thin light-sensitive dye film. The transparent cell and dye film are exposed through the masking negative to cure exposed portions of the dye film, after which the masked dye film portions are removed from the cell leaving the cured portions forming a replica of the original paper sketch.

In the preferred form of the invention, the original paper sketch comprises one of a succession of outline sketches of an animated character or characters depicted in sequential positions of character movement. Selected regions of the outline sketch may be filled in or otherwise darkened by the artist, as desired. This paper sketch is initially photographed and a photographic negative is produced, preferably by a photolithographic process, to have an opaque black field surrounding a transparent configuration corresponding with the dark lines and the selected darkened regions of the paper sketch.

The photographic negative is placed as a mask over the transparent cell having the thin dye film on its upwardly presented face. In the preferred form, the transparent cell comprises a relatively sturdy sheet of highly transparent polyester, and the dye film comprises a thin coating of a light-curable substance selected for its color and sensitivity to light of selected wave length, such as ultraviolet light. In one form, the negative is placed directly over the cell and dye film and the negative is exposed to light of selected wave length to cure the dye film directly underlying the transparent configuration of the negative, after which the remaining masked portions of the dye film underlying the opaque black field are removed from the transparent cell. In another preferred form, a light diffusion screen is interposed between the negative and the dye film to diffuse light passing through the transparent configuration on the negative, resulting in an uneven curing of the dye film such that, after the uncured portions of the dye film are removed from the cell, the remaining cured portions forming the replica of the original sketch have a character generally resembling originally drawn pencil lines.

The thus-formed animation or cartoon cell bearing the replica of the original paper sketch is composited in stacked registry with a selected number of other cells, typically in front of a pictorial background, to form an animation scene which can be photographed to provide, for example, a single frame of an animated motion picture.

Other features and advantages of the present invention will become more apparent from the following detailed description, taken in conjuction with the accompanying drawings, which illustrate, by way of example, the principles of the invention.

BRIEF DESCRIPTION OF THE DRAWINGS

The accompanying drawings illustrate the invention. In such drawings:

FIG. 1 is a schematic perspective view illustrating an original outline sketch on paper depicting an animated character or the like in one position of a successive action sequence;

FIG. 2 is a schematic perspective view illustrating formation of a photographic negative of the paper sketch;

FIG. 3 is a schematic perspective view, partly in exploded form, illustrating controlled light exposure through the negative of a transparent cell bearing a thin film of a light-sensitive dye of selected color;

FIG. 4 is a schematic perspective view illustrating post-exposure processing of the transparent cell to form an animation or cartoon cell including a replica of the paper sketch;

FIG. 5 is a schematic perspective view illustrating addition of color and the like to the cartoon cell; and FIG. 6 is a schematic perspective view, partially in exploded form, illustrating compositing of several cartoon cells to form a single animation scene.

DETAILED DESCRIPTION OF THE PREFERRED EMBODIMENT

As shown in the exemplary drawings, an improved animation transfer process is provided for transferring an original sketch of an animated character or the like, referred to generally by the reference numeral 10, from paper 12 onto a sheet 14 of transparent material, commonly referred to as a cell. This transfer process comprises a photographic technique producing a replica 10' of the original sketch 10 on the transparent cell 14 to form a so-called cartoon cell. This cartoon cell may be composited in stacked registry with a selected number of other cartoon cells, as shown in FIG. 6, to form an animation scene which can be photographed to provide, for example, a single frame of an animated motion picture.

The improved animation transfer process of the present invention advantageously permits an artist's original sketch 10 drawn on the paper 12, as viewed in FIG. 1, to be transferred by replication onto the transparent cell with a high degree of precision and in accordance with process steps conducive to increased automation. As a result, the cartoon cell including the sketch replica 10' is produced more rapidly and substantially more economically than previous animation transfer processes requiring, for example, hand tracing or photocopying of the original sketch 10. The cartoon cell formed in accordance with the present invention includes little or no imperfections, such as background clutter inherent with photocopying processes, thereby reducing or eliminating the need for manual cell clean-up prior to use in an animation scene. Moreover, the process of this invention permits reproduction of multiple and/or replacement cartoon cells without requiring repeated use of the original paper sketch, thereby permitting the original sketch to be safely and permanently stored.

As shown in FIG. 1, in accordance with conventional production of animated motion pictures, the original sketch 10 of an animated character or characters is drawn typically with a pencil 16 by an animator artist directly onto the sheet of paper 12. This original sketch 10 comprises an outline sketch of all or portions of the animated character depicted in a single position of movement within an overall successive action sequence. Registration holes 18 are normally provided in the paper 12 to insure proper alignment of the sketch 10 with other sketches (not shown in FIG. 1) composited to form an animation scene, as will be described in more detail. Importantly, in accordance with the present invention, the original sketch 10 may include selected darkened regions 20 which have been filled in or otherwise embellished by the artist to include appropriate shading, highlighting, or the like in addition to the outline contour of the animated character.

The original paper sketch 10 is initially photographed at a photographic station 22, depicted schematically in FIG. 2. As shown, this photographic station 22 includes a stationary support platform 24 having upstanding alignment pins 26 for reception through the registration holes 18 in the paper 12 to retain the original sketch 10 in a predetermined position beneath an overhead camera 28. This camera 28 may be of any convenient type and functions to photograph the original paper sketch 10 to produce a photographic negative thereof, preferably by means of a conventional photolithographic process. This negative 30 includes an opaque black field 32 corresponding with unmarked regions of the original sketch, wherein this black field 32 surrounds a transparent configuration 34 conforming with the outline contour and any darkened regions 20 of the original sketch. Conveniently, the thus-formed photographic negative 30 comprises any standard negative material designed for high quality photographic reproduction and dimensionally stable long-term storage capability.

As soon as the photographic negative 30 is produced, the original paper sketch 10 can be placed in safe storage without further manual handling or processing, thereby providing an accurate original historical record with minimum risk of damage from mishandling. The photographic negative 30 is used for subsequent production of the cartoon cell, and this negative is available for reproducing multiple cartoon cells for different uses and/or for producing replacement cartoon cells in the event of inadvertent damage to a cartoon cell during production of a motion picture or the like.

As shown in FIG. 3, the photographic negative is used as an overlay mask at a cell exposure station 36 to control light exposure of an underlying transparent cell 14 having a thin film 38 of an unexposed light-sensitive dye applied to its upwardly presented face. More particularly, in accordance with the preferred form of the invention, the transparent cell 14 is formed from a relatively sturdy and highly transparent sheet of plastic material, preferably such as a polyester sheet having a thickness on the order of about 4 mils for sufficient rigidity to minimize damage during handling. This transparent polyester cell 14 bears on one side the thin dye film 38 of a light-sensitive emulsion curable upon exposure to light of selected wave length, such as ultraviolet light. The light-curable dye film 38 is provided conveniently in a selected one of a variety of different colors chosen to correspond with color characteristics of the cartoon cell to be produced, as will be described in more detail. One example of a suitable transparent cell 14 bearing a light-sensitive dye film 38 comprises a selected color proofing film, such as those available commercially from Enco Printing Products of Somerville, N.J., under the trademarks NAPS and PAPS.

The dye film-bearing transparent cell 14 is placed onto a support platen 40 in a predetermined position beneath an overhead light source 42 including a lamp 44 for generating light of selected wave length and a downwardly open reflector 46 for directing that light downwardly toward the underlying platen 40. Registration pins 48 upstanding from the support platen 40 may be provided to anchor the transparent cell 14 in a predetermined position, with the cell 14 including preformed openings 50 for reception of said registration pins 48. In addition, vacuum means (not shown) of a type well known to those skilled in the art may be provided to act through the support platen 40 to further hold the transparent cell in a stationary position thereon. One example of a suitable cell exposure station 36 including the support platen 40 and the overhead light source 42 is exemplified by the automatic exposure printer manufactured by Berkey Ascor Printing Systems under the name AUTO GRAPHICA and marketed by Pako of Golden Valley, Minn.

The photographic negative 30 is placed over the dye film-bearing transparent cell 14 in stacked registry therewith and retained in position by reception of the registration pins 48 through alignment holes 52 in the negative. The opaque black field 32 of the negative thus masks underlying regions of the light-sensitive dye film 38 to prevent exposure thereof upon illumination by the overhead light source 42. The transparent configuration 34 of the negative, however, permits light from the overhead light source 42 to pass downwardly through the negative to expose and cure the dye film 38 in a pattern corresponding with and thus replicating the original sketch 10.

In one form of the invention, at the cell exposure station 36, the photographic negative 30 is placed directly over the dye film-bearing transparent cell such that the exposed dye film pattern is uniformly thick and solid in accordance with the transparency of the transparent configuration 34. Alternatively, as shown in FIG. 3, a light diffusion screen 54 is desirably interposed between the overlying negative 30 and the underlying dye film-bearing cell 14, with registration holes 56 in the diffusion screen 54 receiving the platen registration pins 48 to retain the components in fixed alignment. This light diffusion screen 54 diffuses light passing downwardly through the transparent configuration 34 of the negative 30 and thus partially obstructs exposure of the underlying dye film 38 resulting in exposure and curing of the dye film in a pattern having characteristics generally resembing originally drawn pencil lines. Although the diffusion screen 54 may take various forms, one preferred form which has been successfully tested comprises a transparent polyester sheet painted with a thin paint film applied on one side by an airbrush process, with the paint film dispersion and thickness directly altering the level of light obstruction by the screen. Alternatively, the diffusion screen 54 may comprise a photographic negative reproduction of the above-described airbrush screen.

Subsequent to the cell exposure station 36, the dye film-bearing transparent cell 14 is delivered to a cleaning/processing station 58, as shown in FIG. 4. At this station 58, the film-bearing transparent cell 14 is passed through a processor 60 which appropriately washes or otherwise removes the masked nonexposed portions of the dye film 38 leaving only the exposed portions forming the replica 10' of the original sketch 10 and which, upon exposure to light, have been substantially permanently bonded onto the transparent cell 14. Importantly, this replica 10' includes selected darkened regions 20' of substantially uniform darkness or color intensity throughout to correspond with selected darkened regions 20 of the original sketch 10. While a variety of different processers 60 may be used at this cleaning/processing station 58, the processer may take the form of a standard developer/processer of the type designed for developing overlay color proofing film, such as a processer sold under the trademark NAPS/PAPS by Enco Printing Products of Somerville, N.J.

The thus-formed transparent cell 14 bearing the replica 10' of the original sketch 10 can be appropriately backed-up with color or other additional visual effects, such as highlighting and the like. This step is normally done by using a paintbrush 62, as shown in FIG. 5, to apply paint or the like onto the reverse side of the transparent cell 14, wherein the paint is visible from the front side. In this regard, the particular paint colors used can be chosen to conform with the selected color of the cured dye film forming the sketch replica 10' and any selected darkened region 20'.

The finished animation or cartoon cell including the sketch replica 10' and appropriate back-up color and the like is assembled in stacked registry with a plurality of other cartoon cells having related but different sketches transferred thereto, with two additional cells 14' and 14'' being shown in FIG. 6 by way of example. These cells are typically composited in overlying stacked registry upon a support plate 64 having upstanding registration pins 66 for reception through the preformed openings 50, 50', and 50'' in the stacked cells. When assembled, the plurality of cartoon cells cooperate with one another to form an animation scene, typically placed in front of a pictorial background supported by the plate 64. When photographed, the animation scene may be used as a single frame showing one position of a successive action sequence for an animated motion picture.

The photographic animation transfer process of the present invention thus provides a relatively simple and economical method for reproducing an original animation sketch onto a transparent cell for use in making animated motion pictures and the like. The resultant cartoon cell bearing the replicated original sketch is highly durable and resistant to damage and provides a high-quality base for back-up paint and the like. Moreover, substantial regions of the cartoon cell can be formed with selected color by appropriate shading or filling in of the original sketch, thereby reducing the quantity of back-up color required.

A variety of modifications and improvements to the present invention are believed to be apparent to those of ordinary skill in the art. Accordingly, no limitation on the invention is intended, except as set forth in the appended claims.

What is claimed is:

1. A photographic animation transfer process, comprising the steps of:
   photographing a sketch and producing a negative of the sketch;
   placing the negative as a mask over a transparent cell sheet having a light-sensitive dye film thereon;
   exposing the negative and underlying dye film-bearing cell sheet to light of a wave length selected for curing of the dye film; and
   removing masked unexposed portions of the dye film from the cell sheet leaving exposed cured portions of the dye film on the cell sheet in a pattern forming a replica of the sketch.

2. The photographic animation transfer process of claim 1 wherein said photographing and negative-producing step comprises producing the negative by a photolithographic process.

3. The photographic animation transfer process of claim 1 wherein said photocopying and negative-producing step comprises producing the negative to have an opaque field surrounding a transparent configuration corresponding with the sketch.

4. The photographic emulsion transfer process of claim 1 wherein said placing step comprises placing the negative over a transparent cell sheet having a light-sensitive dye film of selected color thereon.

5. The photographic animation transfer process of claim 1 wherein said placing step comprises placing the negative over a transparent polyester sheet having a thickness of about four mils and having the light-sensitive dye film on one side thereof.

6. The photographic animation transfer process of claim 1 further including the step of placing a light diffusion screen between the negative and the transparent cell sheet having the dye film thereon prior to said exposing step.

7. The photographic animation transfer process of claim 6 further including the step of forming said light diffusion screen, said forming step including airbrush painting one side of a transparent screen sheet with a selected paint dispersion and density.

8. The photographic animation transfer process of claim 1 further including the step of backing up the transparent cell sheet with selected color subsequent to said removing step.

9. The photographic animation transfer process of claim 1 further including the steps of maintaining the sketch in predetermined registry with a camera during said photographing step and maintaining the negative in predetermined registry with the dye film-bearing cell sheet during said exposing step.

10. A photographic animation transfer process, comprising the steps of:
    photographically reproducing an animated sketch into the form of a photographic sheet including an opaque field in combination with a transparent configuration cooperatively conforming to the sketch;
    placing the photographic sheet as a mask over a transparent cell sheet and a light-responsive dye film;
    exposing the transparent cell sheet and dye film to light through the masking photographic sheet to expose a first portion of the dye film underlying the transparent configuration and to mask a second portion of the dye film underlying the opaque field; and
    processing the transparent cell sheet and dye film to remove one of the first and second dye film portions, the other of the first and second dye film portions being bonded onto the transparent cell sheet in a pattern defining a replica of the sketch.

11. The photographic animation transfer process of claim 10 wherein the transparent configuration of the photographic sheet is formed in a pattern matching the sketch.

12. The photographic animation transfer process of claim 11 wherein the second dye film portion is removed from the cell sheet during said processing step, the first dye film portion being bonded to the cell sheet during said exposing step.

13. The photographic animation transfer process of claim 12 wherein said exposing step further includes exposing the cell sheet and dye film through a light diffusion screen.

14. A photographic animation transfer process, comprising the steps of:
    photographically producing a negative of an animated sketch, the negative including a transparent configuration corresponding with the sketch and surrounded by a substantially opaque field;
    placing the negative in aligned registry over a transparent polyester cell sheet having a thickness of about four mils and a thin light-sensitive dye film of selected color on one side thereof;
    exposing the cell sheet and dye film through the negative to expose a first portion fo the dye film underlying the transparent configuration and to mask a second portion of the dye film underlying the opaque field; and
    processing the cell sheet and dye film to remove the masked second dye film portion, the first dye film portion being bonded onto the cell sheet during the exposing step and remaining thereon in a pattern defining a substantial replica of the sketch.

15. The photographic animation transfer process of claim 14 wherein said negative producing step comprises a photolithographic process.

16. The photographic animation transfer process of claim 14 including the step of placing a light diffusion screen over the cell sheet and dye film during the exposing step.

17. The photographic animation transfer process of claim 14 further including the step of backing up the transparent cell sheet with selected color subsequent to said processing step.

18. A system for producing a cartoon cell from an animated sketch, comprising:
    a photographic station including means for photographing the sketch and for producing a photographic negative thereof including a transparent configuration corresponding with the sketch and surrounded by a substantially opaque field;
    a transparent cell sheet having a relatively thin light-sensitive dye film on one side thereof;
    a cell exposure station including means for supporting said negative in a masking position overlying said cell sheet and dye film and means for exposing said cell sheet and dye film to light of selected wave length through said negative to expose a first portion of the dye film underlying the transparent configuration and to mask a second portion of the dye film underlying the opaque field; and
    a processing station including means for removing the masked second dye film portion from said cell sheet, said first dye film portion being bonded onto said cell sheet upon said exposure to light and remaining on said cell sheet in a pattern generally replicating the sketch, said cell sheet and said first dye film portion forming the cartoon cell.

19. The system of claim 18 wherein said photographic station includes means for photolithographically producing said negative.

20. The system of claim 18 wherein said dye film has a selected color.

21. The system of claim 18 wherein said cell sheet is formed from polyester having a thickness of about four mils.

22. The system of claim 18 wherein said cell exposure station further includes a light diffusion screen, said cell sheet and dye film being exposed to light through said negative and said diffusion screen.

23. The system of claim 18 wherein said photographic station includes means for retaining the sketch in predetermined alignment with said photographing means, and wherein said cell exposure station includes means for retaining said negative in predetermined alignment with said cell sheet and dye film.

24. The transparent cell sheet with the sketch replica thereon produced by the process of claim 1.

* * * * *